(12) United States Patent
Ayabe

(10) Patent No.: US 7,556,309 B2
(45) Date of Patent: Jul. 7, 2009

(54) BONNET STRUCTURE FOR WORKING VEHICLE

(75) Inventor: Hiroaki Ayabe, Fukuoka (JP)

(73) Assignee: Yanmar Co., Ltd., Osaka (JP)

( * ) Notice: Subject to any disclaimer, the term of this patent is extended or adjusted under 35 U.S.C. 154(b) by 0 days.

(21) Appl. No.: 11/908,625

(22) PCT Filed: Jan. 17, 2006

(86) PCT No.: PCT/JP2006/300472

§ 371 (c)(1),
(2), (4) Date: Nov. 28, 2007

(87) PCT Pub. No.: WO2006/098079

PCT Pub. Date: Sep. 21, 2006

(65) Prior Publication Data

US 2008/0185873 A1    Aug. 7, 2008

(30) Foreign Application Priority Data

Mar. 14, 2005  (JP) ............................. 2005-071905

(51) Int. Cl.
*B62D 25/10* (2006.01)
(52) U.S. Cl. .............................. 296/193.11; 180/69.21; 180/89.17
(58) Field of Classification Search ............ 296/193.11; 180/69.2, 69.21, 69.24, 69.25, 89.17
See application file for complete search history.

(56) References Cited

U.S. PATENT DOCUMENTS

| 5,680,244 | A | * | 10/1997 | Ono et al. ................... 180/68.1 |
| 5,901,803 | A | * | 5/1999 | Harada ....................... 180/69.2 |
| 6,030,029 | A | * | 2/2000 | Tsuda et al. ............. 296/203.02 |
| 6,374,936 | B1 | * | 4/2002 | Smith ....................... 180/89.17 |
| 7,270,367 | B2 | * | 9/2007 | Mairing ................. 296/193.11 |
| 2004/0216934 | A1 | | 11/2004 | Tomiyama et al. |
| 2005/0274491 | A1 | * | 12/2005 | Evans et al. .................... 165/98 |

FOREIGN PATENT DOCUMENTS

| JP | 56-111017 | 8/1981 |
| JP | 3-24978 | 3/1991 |
| JP | 3-91867 | 9/1991 |

(Continued)

OTHER PUBLICATIONS

International Search Report for PCT/JP2006/300472, Jan. 17, 2006.

*Primary Examiner*—Jason S Morrow
(74) *Attorney, Agent, or Firm*—Sterne, Kessler, Goldstein & Fox P.L.L.C.

(57) ABSTRACT

A working vehicle includes a vehicle frame having a front section and a bonnet arranged on the front section. A first engagement mechanism for the bonnet is provided at a front section of the vehicle frame and a second engagement mechanism is provided at a front lower end section of the bonnet. A front face of the vehicle frame includes a cutout section and a cover doubling as a seal member for the bonnet is provided at the cutout section. When the first and second engagement mechanisms are engaged, the first and second engagement mechanisms are positioned on one side of the cutout section and a portion of the cover that covers the cutout section is positioned on an opposite side of the cutout section. The construction can provide the bonnet with high assembly accuracy.

8 Claims, 15 Drawing Sheets

FOREIGN PATENT DOCUMENTS

| | | |
|---|---|---|
| JP | 5-32642 | 4/1993 |
| JP | 2003-146052 | 5/2003 |
| JP | 2003-327169 | 11/2003 |
| JP | 2004-224307 | 8/2004 |
| JP | 2004-237779 | 8/2004 |

* cited by examiner (a)

(b)

(a)

(b)

(a)

(b)

BONNET STRUCTURE FOR WORKING VEHICLE

TECHNICAL FIELD

The present invention relates to an arrangement structure for a bonnet of a working vehicle, more specifically, to a structure for a seal of the bonnet.

BACKGROUND ART

Conventionally, a sealing material is arranged on an inner surface of the bonnet, a seal receiving surface is formed on the inner surface of the bonnet, and a sealing material is arranged at an outer peripheral edge section of a radiator device, as this is known to enhance the sealing property of the bonnet (e.g., Japanese Patent Application Laid-Open No. 2004-224307)

DISCLOSURE OF THE INVENTION

Problem to be Solved

Although the cooling wind that flows into the radiator is taken into consideration, behavior of the wind in the bonnet is not taken into consideration. Furthermore, the sealing material must be arranged on both the inner surface of the bonnet and the outer peripheral edge section of the radiator. Thus, high assembly accuracy is demanded for the bonnet, and the cooling performance of the radiator might change due to the assembly accuracy.

Solution

The present invention relates to an openably constructed bonnet structure for a working vehicle wherein engagement mechanisms for the bonnet are provided at a front section of a vehicle frame, on which front section the bonnet is placed, and at a front lower end section of the bonnet; and a cutout section through which the engagement mechanism of the bonnet is viewable is provided in the front face of the vehicle frame.

A cover doubling as a seal member of the bonnet is provided at the cutout section.

A cover for covering the cutout section is extended to the front face of the frame, and a key lock is provided on the cover.

An installation section for a stay for supporting the back section of the bonnet is arranged on the vehicle frame and a projection for covering the installation section for the stay is provided on the frame; and a seal for the bonnet is provided at the projection.

EFFECTS OF THE INVENTION

In the present invention, the adjustment of the bonnet position is easily performed with the bonnet closed.

The assembly accuracy and the outer appearance of the working vehicle can be enhanced while enhancing assembly performance of the bonnet.

The aesthetic of the front section of the frame of the working vehicle can be enhanced, and a space for attaching a face plate and the like can be ensured with an inexpensive structure. Furthermore, the face plate and the like is less likely to be stripped due to surface finishing of the cover.

The arrangement of the member in the bonnet can be performed using the vehicle frame, and a space in the bonnet can be effectively used.

Figure 1:
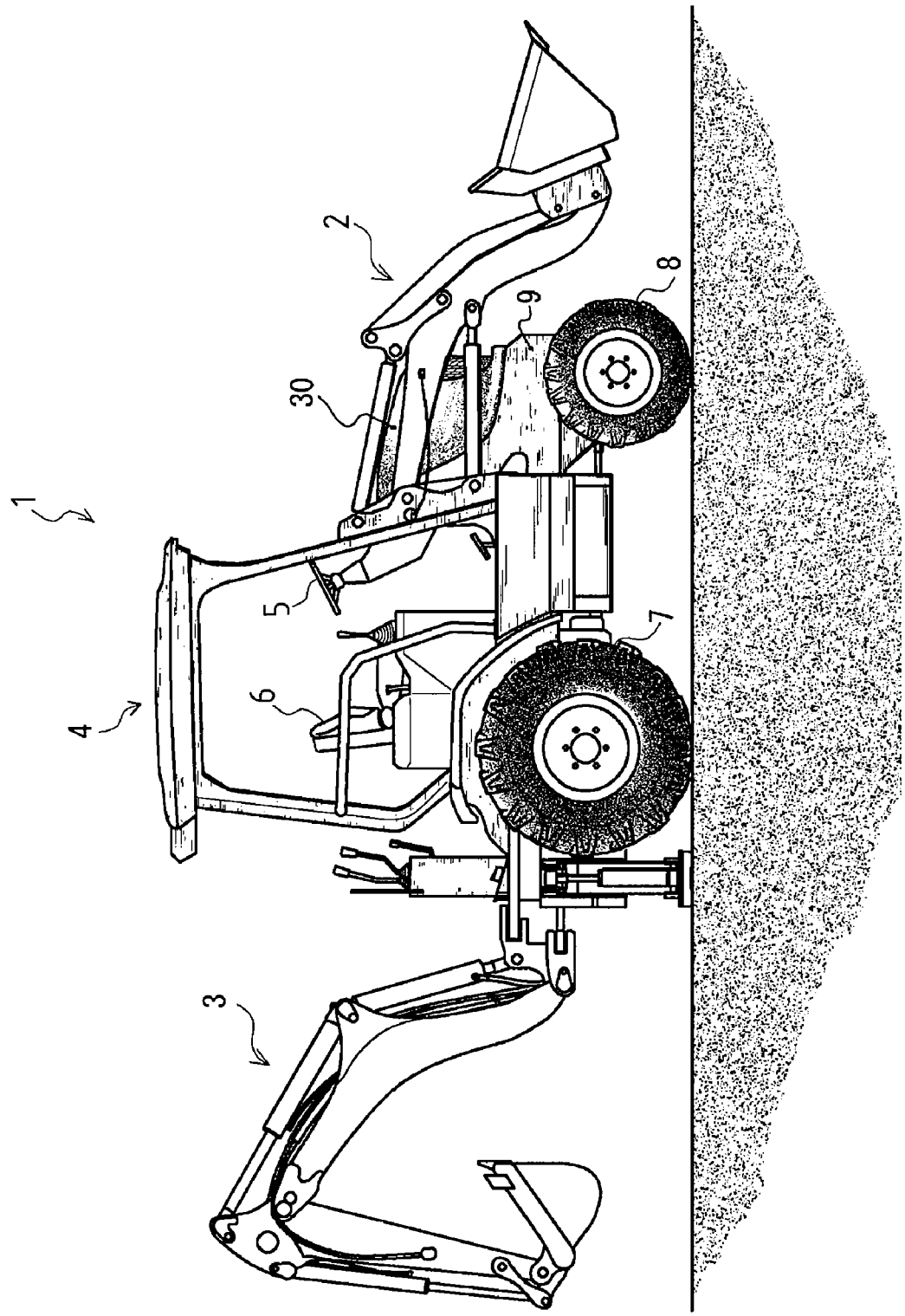
FIG. 1 is an overall side view of a working vehicle.

EXPLANATION OF REFERENCE NUMERALS 30 bonnet
32, 33 seal
34 air cleaner
35 stay
36 cover
40 arm
61 front plate
65 rib

BEST MODE FOR CARRYING OUT THE INVENTION

The present invention forms an opening in a frame to check the position when arranging the bonnet and arranges a sealing material between the bonnet and the frame to control the flow of cooling wind in the bonnet.

Example 1

Overall Structure

A working vehicle according to one embodiment of the present invention will now be described.

FIG. 1 is an overall side view of the working vehicle.

The working vehicle 1 shown in FIG. 1 is a tractor loader back hoe attached with a loader 2 and a drilling device 3. A control section 4 is arranged at the center of the working vehicle 1, where the loader 2 is arranged on the front side of the control section 4 and the drilling device 3 is arranged on the back side. The working vehicle 1 is attached with front wheels 8 and back wheels 7, and is configured to travel with the loader 2 and the drilling device 3 attached thereto.

A steering handle 5 and an operator's seat 6 are arranged in the control section 4, and a travel operation device and an operation device for the loader 2 are arranged on the side of the seat 6. The control section 4 enables the steering operation of the working vehicle 1 and the operation of the loader 2.

The loader 2, which is a loading device, is connected to the side section of the working vehicle 1 and extended towards the front side, and a bucket is attached at the distal end.

The drilling device 3 is removably attached to the back section of the working vehicle 1, and the operation of the drilling device 3 is carried out by an operation device arranged on the back side of the operation seat 6.

[Structure of Front Section of Working Vehicle]

The structure of the front section of the working vehicle 1 will now be described.

Figure 2:
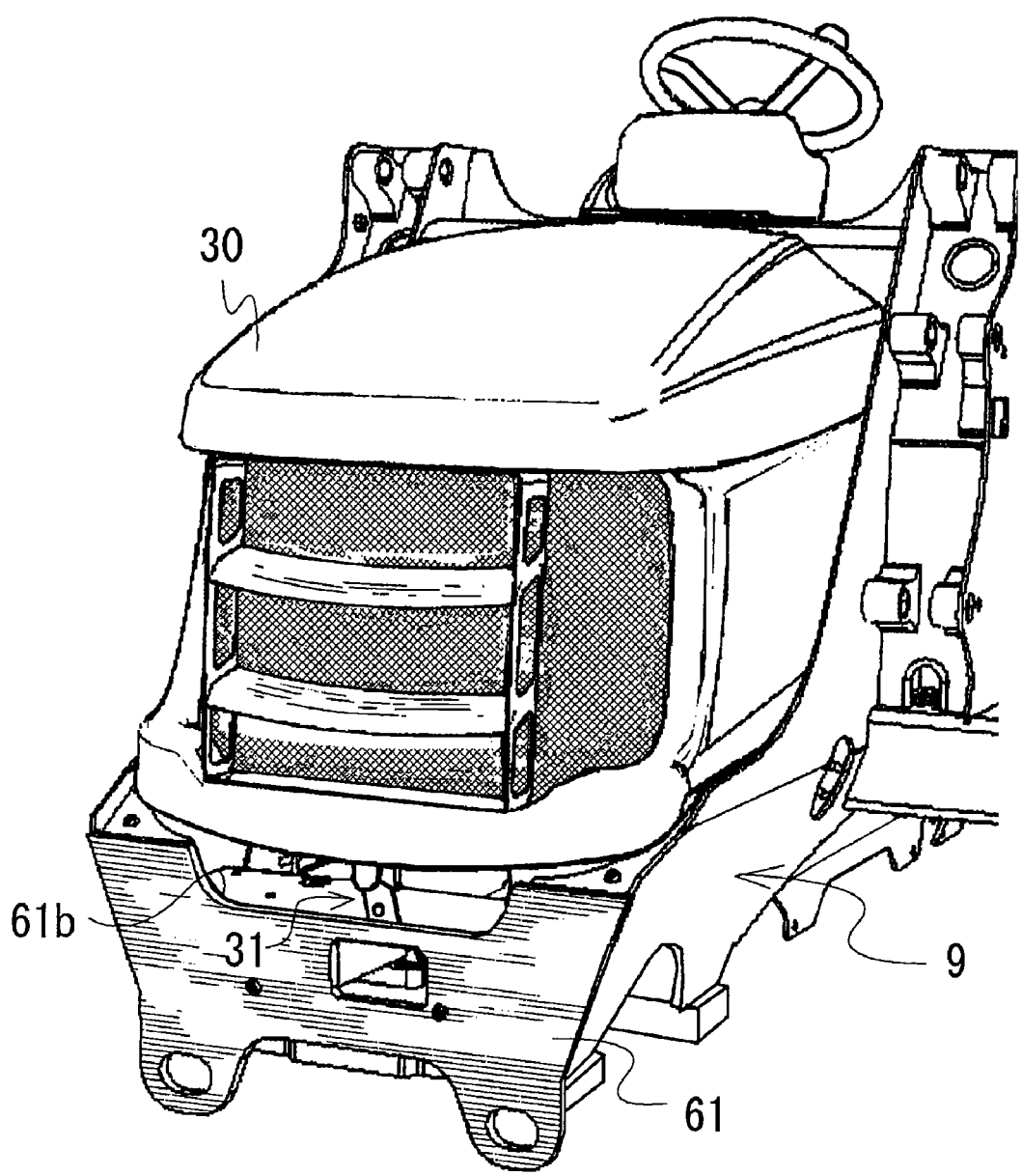
FIG. 2 is a perspective view showing a structure of a front section of a working vehicle.

FIG. 2 is a perspective view showing a structure of the front section of the working vehicle.

Figure 3:
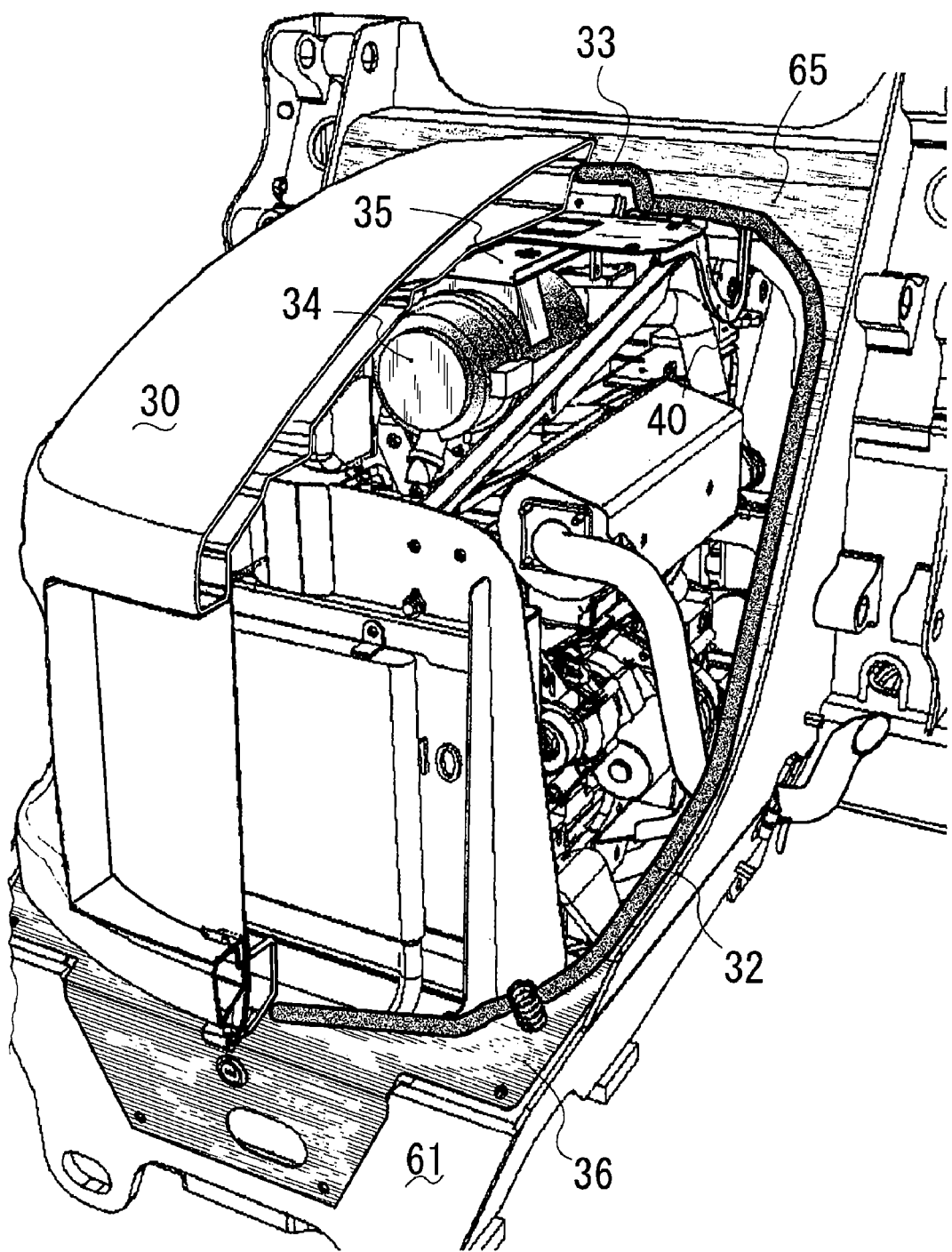
FIG. 3 is perspective partial cross sectional view showing a structure of the inside of a bonnet.

FIG. 3 is a perspective partial cross sectional view showing a structure in the bonnet.

A bonnet 30 is arranged on a frame 9 at the front section of the working vehicle 1. The bonnet 30 is made of resin, and has a hollow structure. The bonnet 30 is arranged at the front side of the control section 4 of the working vehicle 1, and covers an engine arranged on the frame 9. Accessory equipment of the engine such as a radiator, a muffler, and an air cleaner 34 are arranged in the bonnet 30 along with the engine.

The bonnet 30 is openably constructed with respect to the frame 9, and is opened by turning the front section of the bonnet 30 upward. An arm 40 is connected to the inner surface at the back section of the bonnet 30, and a hinge is arranged at the back end of the arm 40 so as to be freely turned with respect to the frame 9.

The bonnet 30 is integrally configured to cover the upper surface, both left and right side surfaces, and the front face of the engine room, and is engaged by a holding mechanism 31 at the center in the left and right direction of the front lower section so that the bonnet 30 is maintained in a closed state by the holding mechanism 31. The holding mechanism 31 is configured across the frame 9 and the bonnet 30, and is configured by an engagement stay attached to the bonnet 30 and a hook arranged on the frame 9. When the bonnet 30 is closed, the stay and the hook engage, whereby the bonnet 30 is engaged (locked) to the frame 9. An operation lever 42 is connected to the hook and extended downward, where unlocking operation can be performed from an opening 61c formed in the front face of a front plate 61 and a cover 36 to be hereinafter described.

The front face of the frame 9 is configured by the front plate 61, and a cutout section 61b is formed in the front plate 61 so that the holding mechanism 31 is viewable as shown in FIG. 2 where a state in which the cover 36 is detached is shown. The cutout section 61b is formed at the center in the left and right direction of the upper section of the front plate 61. The holding mechanism 31 of a state in which the frame 9 and the bonnet 30 are engaged can be viewed by having the center of the upper section of the front plate 61 formed into a shape that is cutout downward, whereby position adjustment of the bonnet 30 and the position adjustment of the holding mechanism 31 are easily performed.

A rib 65 is arranged on the inner side of the front section of the left and right frames 9 so as to lie along the lower outer peripheral edge of the bonnet 30, that is, the rib 65 is arranged projecting from the frame 9 at the outer periphery of the engine room, and a seal 32 is attached to the rib 65 to seal the frame 9 and the bonnet 30. The seal 32 contacts the lower outer peripheral edge of the bonnet 30 and prevents flow-in of air and water at the edge of the bonnet 30. An opening (grill) is formed on the front face of the bonnet 30, and serves as a cooling wind intake port. The cooling wind introduced into the bonnet 30 from the opening passes through the radiator, cools the engine, and then is discharged downward. The seal 32 contacts the lower outer peripheral edge of the bonnet 30, and the cooling wind is prevented from flowing out from between the edge of the bonnet 30 and the frame 9 (rib 65), whereby hot wind does not blow towards the control section 4 side.

As shown in FIG. 3, the cover 36 is attached so as to cover the cutout section 61b of the front plate 61 and the front upper surface and the like of the frame 9. The cover 36 is formed by bending the plate material into a reversed L-shape in side view, the front face is formed into a substantially trapezoidal shape that covers and closes the cutout section 61b, the upper surface is formed into a shape of being attached to the front lower edge of the bonnet 30 to close the gap of the upper front face of the frame 9, and the back end is configured to continue to the rib 65. The seal 32 is attached to the back edge of the upper surface of the cover 36, thereby preventing flow-in of air and water at the edge of the bonnet 30.

The air cleaner 34 is arranged in a free space in the engine room, which is arranged at the center of the upper section in the bonnet 30 in the present example, and is supported by the stay 35 fixed to the rib 65 and extended projecting towards the front side. With this structure, the space in the bonnet 30 can be effectively used without arranging the supporting member in an upstanding manner at the lower section of the frame 9. Thus, a structure in which the flow of air in the bonnet 30 is not inhibited by the stay 35 or the supporting member of the air cleaner 34 is obtained. A seal 33 is arranged at an arrangement portion for the stay 35 of the rib 65 to surround the stay arrangement portion, so that flow-out of air from the stay arrangement portion is prevented.

[Frame Structure]

The frame structure of the working vehicle will now be described.

Figure 4:
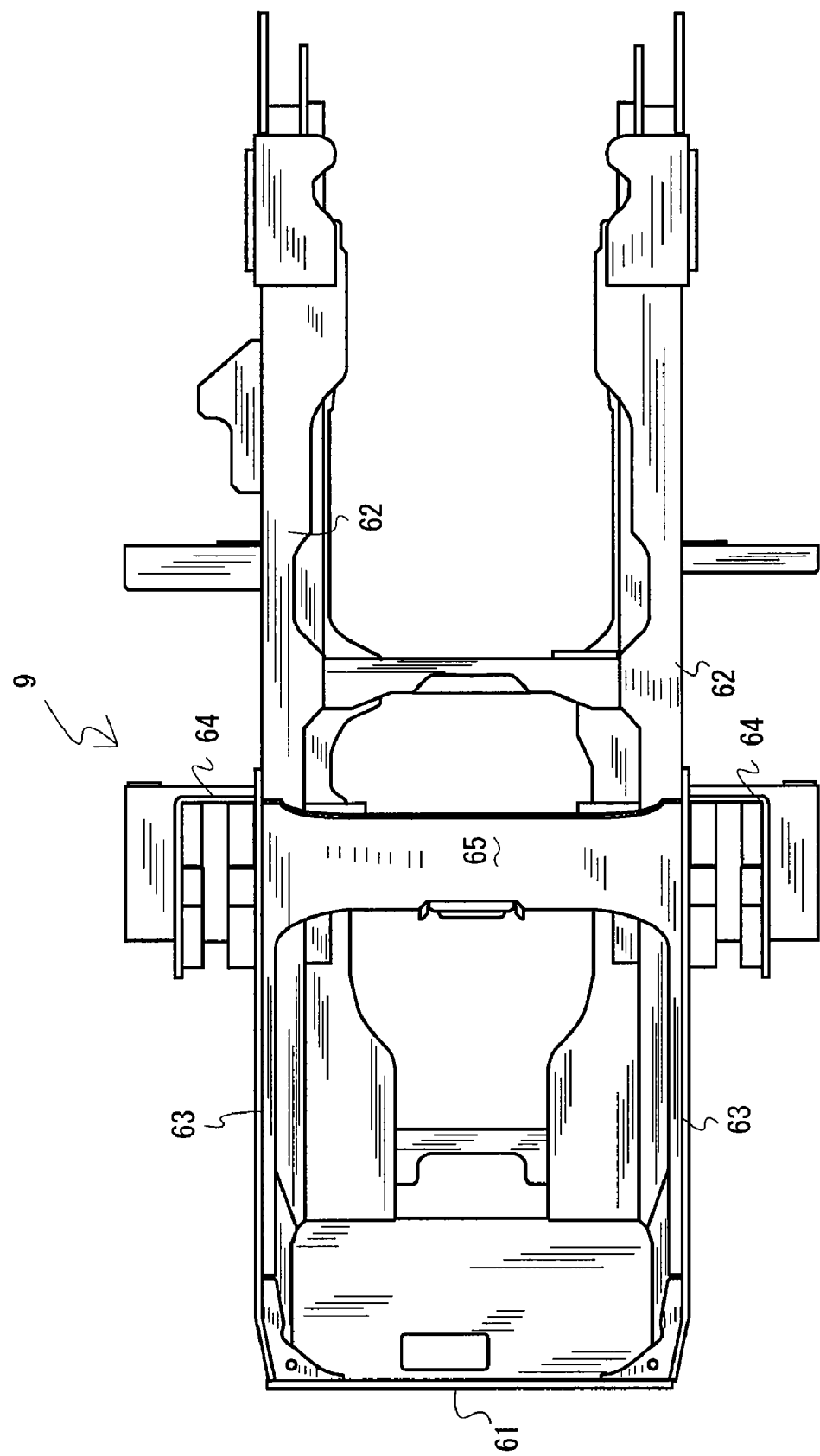
FIG. 4 is a plan view showing a frame of the working vehicle.

FIG. 4 is a plan view showing a frame of the working vehicle.

Figure 5:
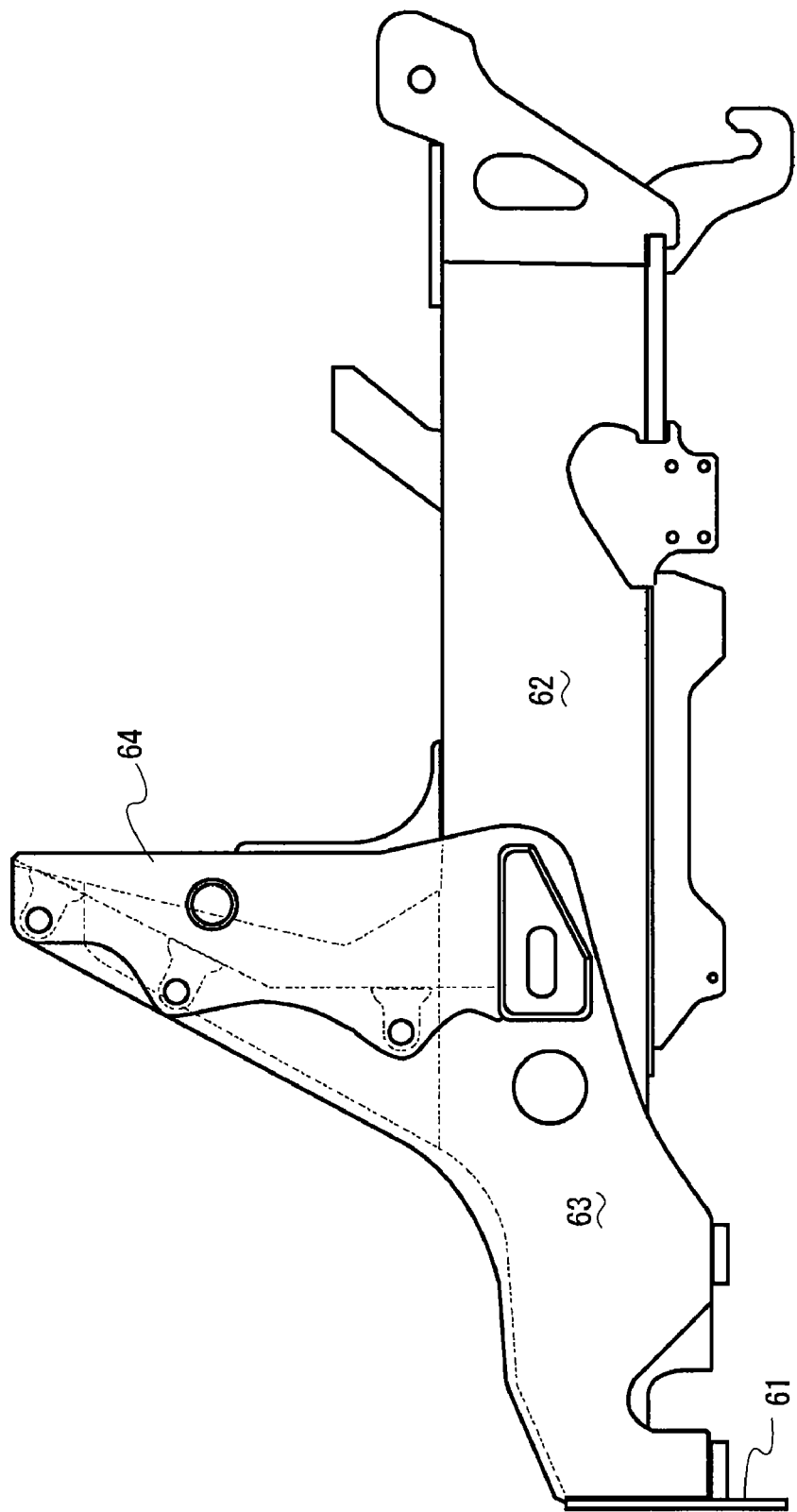
FIG. 5 is a side view of the frame of the working vehicle shown in FIG. 4.

FIG. 5 is a side view of the frame of the working vehicle shown in FIG. 4.

Figure 6:
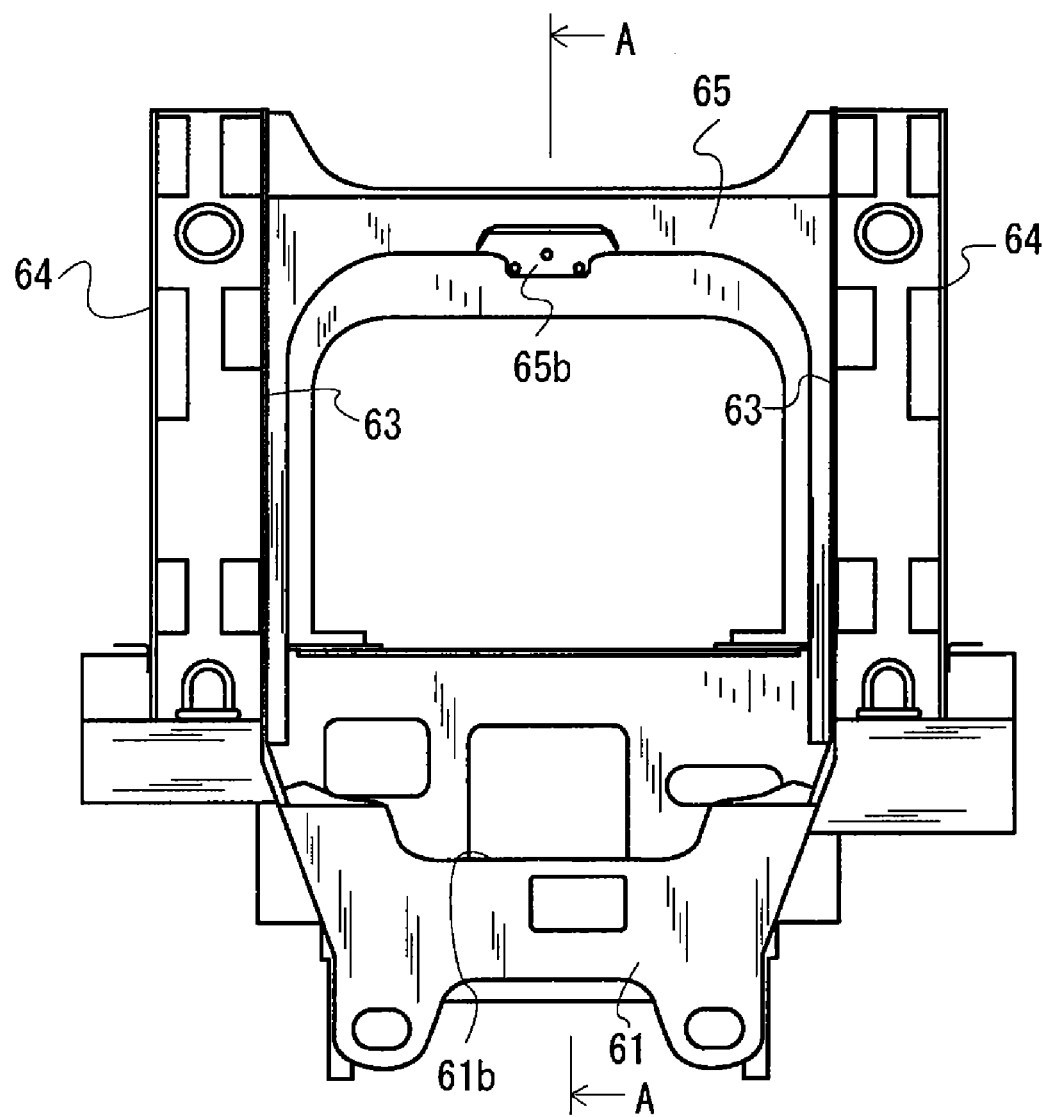
FIG. 6 is a front view of the frame of the working vehicle shown in FIG. 4.

FIG. 6 is a front view of the frame of the working vehicle shown in FIG. 4.

Figure 7:
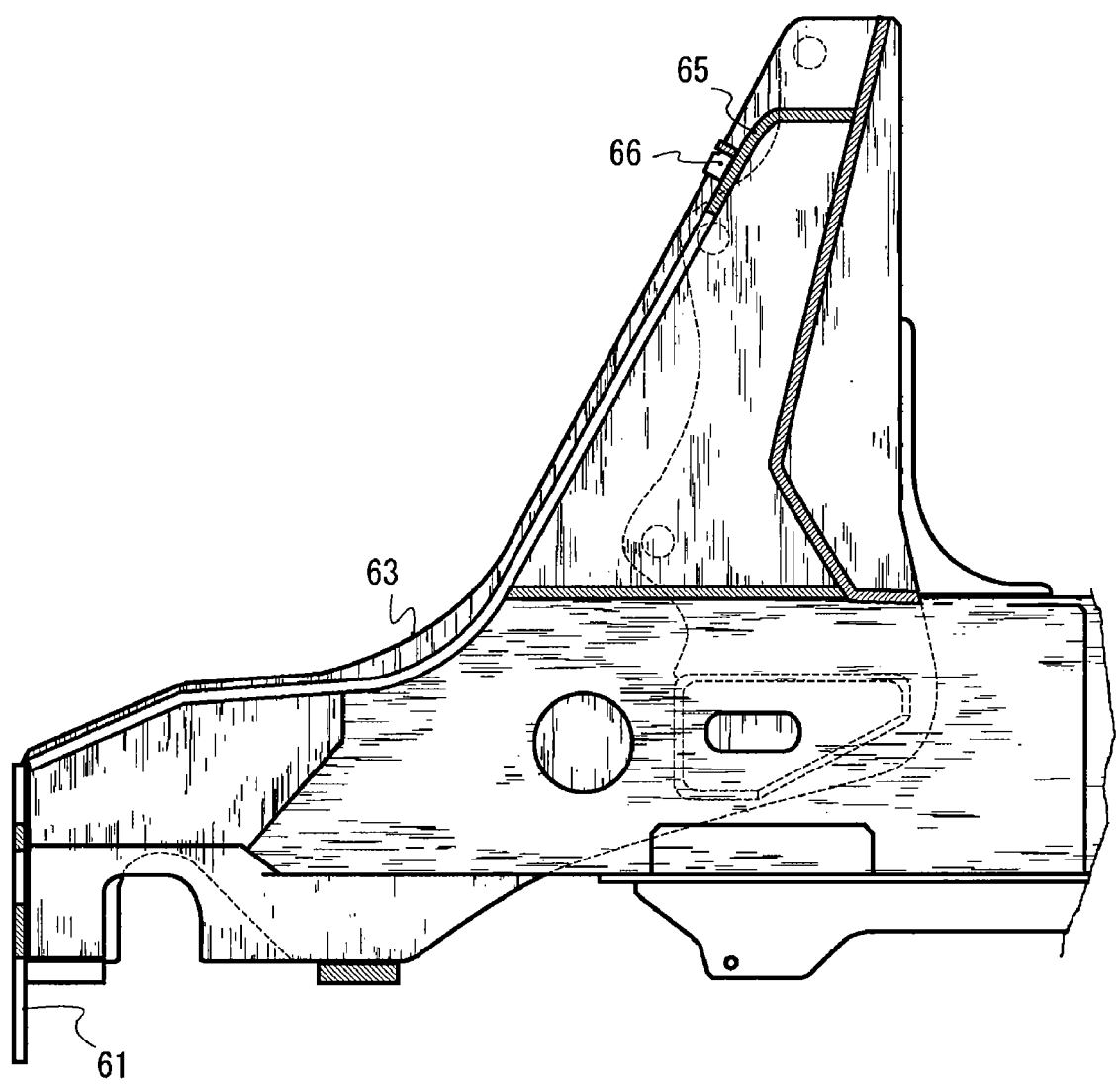
FIG. 7 is a cross sectional view taken along line A-A of FIG. 6.

FIG. 7 is a cross sectional view taken along line A-A of FIG. 6.

The frame 9 is configured by side frames 62 arranged in parallel on the left and the right in the front and back direction, front frames 63 connected to the front section of the side frames 62, and the front plate 61 connected to the front section of the front frames 63. Mast sections 64 are configured on the external surface of the front frames 63, and the front frames 63 are connected by the rib 65.

A connecting member is arranged between the side frames 62, and makes the frame 9 a ladder structure. The front frame 63 is extended to the upper side from the connecting section with the side frame 62, and the mast section 64 is attached at the portion extended to the upper side. An engine is arranged, and the bonnet 30 is arranged between the front frames 63. A raising and lowering mechanism of the loader 2 is connected to the mast section 64, and the loader 2 is supported by the mast section 64.

Figure 14:
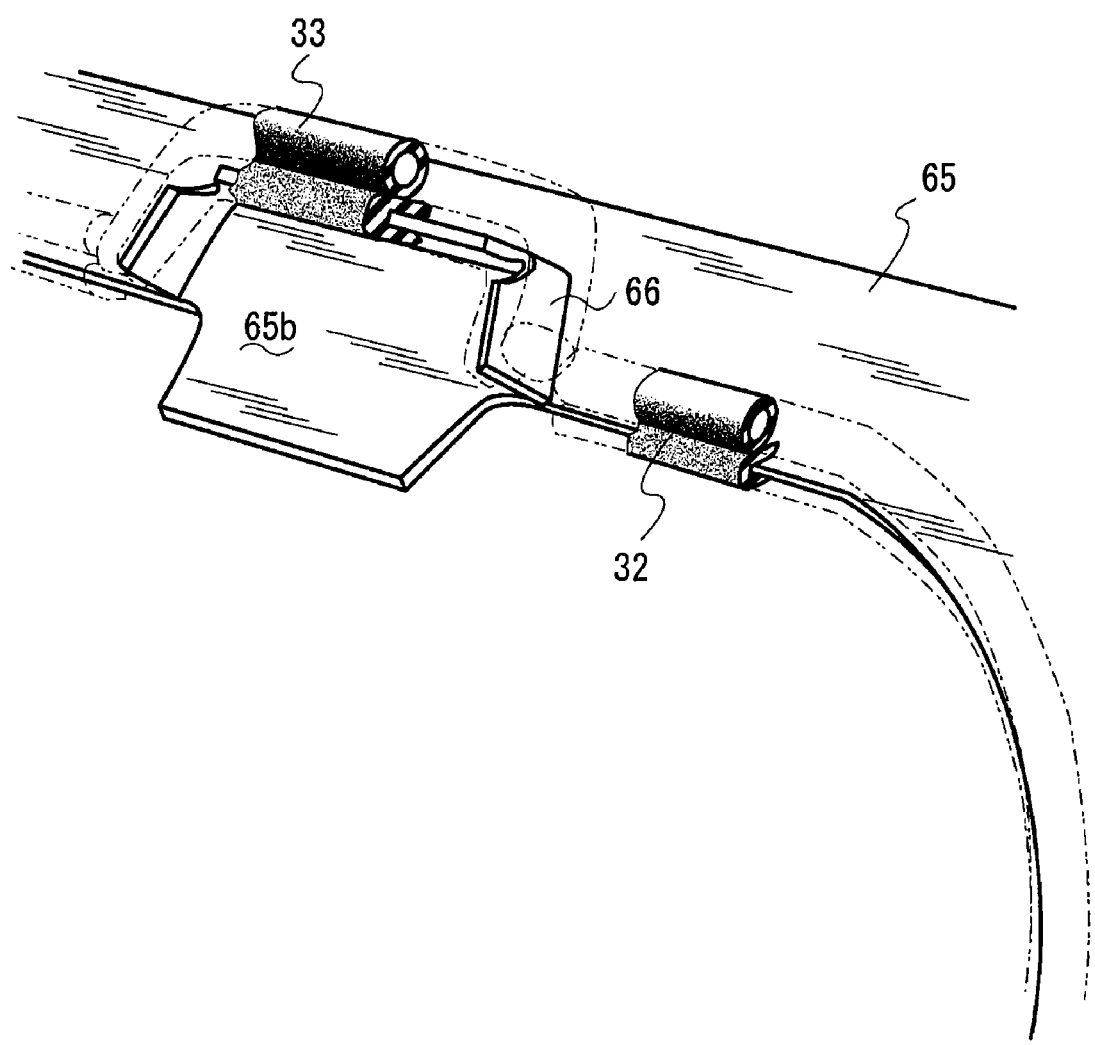
FIG. 14 is a partial cross sectional perspective view showing a seal structure of the stay installation section.

The rib 65 is formed to a substantially reversed U-shape in front view and arranged along the upper front edge of the front frame 63, and has a structure of connecting the left and right front frames 63 at the upper section of the front frame 63. In front view, a stay installation section 65b is formed at the center in the left and right direction of the rib 65. The installation section 65b is formed at a site of connecting the left and right front frames 63, and extended diagonally downward towards the front side. The projection 66 is arranged at the base of the installation section 65b so as to surround the installation section 65b, as shown in FIG. 14. The projection 66 is formed by bending a plate material to a substantially reverse U-shape and is attached in an orthogonal direction to the rib 65.

The seal 32 described above is arranged along the edge of the rib 65, and the seal 33 is arranged at the edge of the projection 66. The edge of the bonnet 30 is thereby sealed.

[Structure of Inner Side of Bonnet]

The internal structure of the bonnet 30 will now be described.

Figure 8:
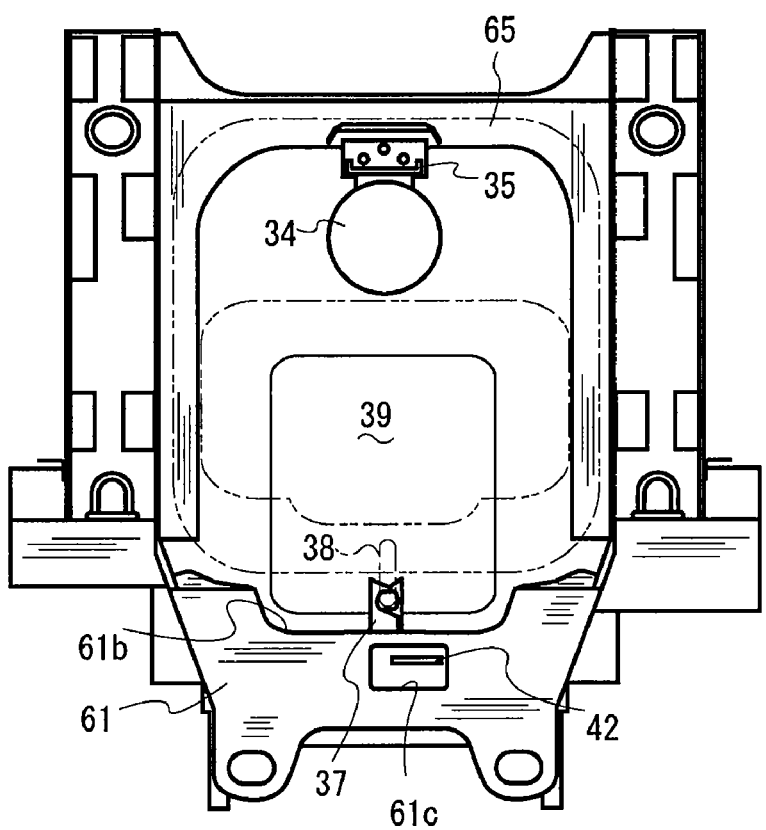
FIGS. 8(a) and 8(b) are frame format views showing an arrangement structure of an engine in the bonnet.
Figure 8:
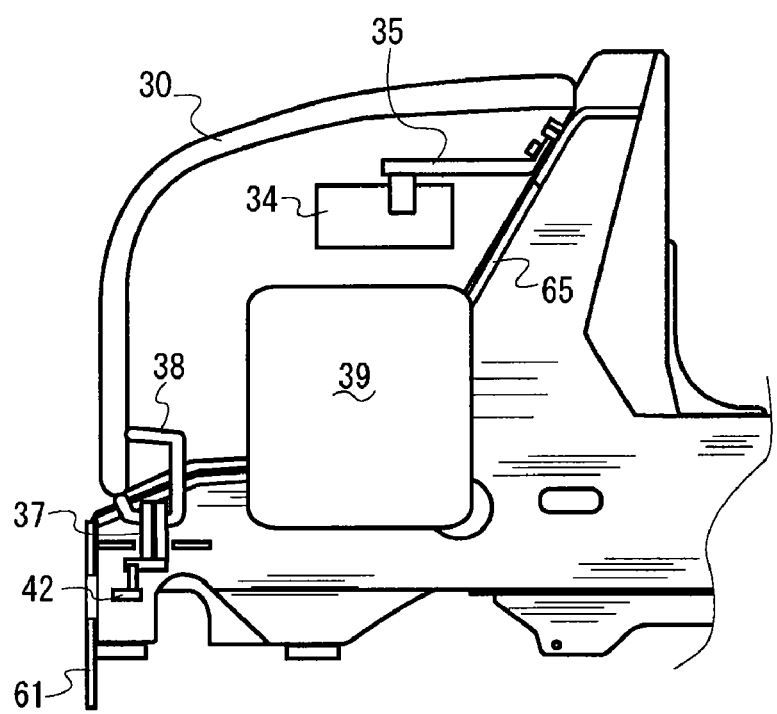

FIG. 8 is a frame format view showing an arrangement structure of an engine in the bonnet.

FIG. 8(a) is a frame format view showing an arrangement structure of the engine in the bonnet in front view, and FIG. 8(b) is a frame format view showing an arrangement structure of the engine in the bonnet in side view.

The engine 39 is arranged in the bonnet 30, and the air cleaner 34 is arranged on the upper side of the engine 39. The engine 39 is mounted on the frame 9, and the air cleaner 34 is supported by the stay 35 attached to the rib 65. The air cleaner 34 thus can be supported without configuring a frame body and the like in the bonnet 30, and a space in which the cooling wind flows is ensured in the bonnet 30.

A hook 37 configuring the holding mechanism 31 is arranged at the front section of the frame 9, and a loop 38 engaging the hook 37 is fixed at the front lower section of the bonnet 30. The loop 38 is extended downward from the lower end of the bonnet 30, and the hook 37 is not hidden by the front plate 61 at the engagement position with the loop 38 by the cutout section 61b of the front plate 61. An opening 61c is formed at the center in the left and right direction of the front face of the front plate 61, so that the lever 42 connected to the hook 37 can be operated through the opening 61c. The hook 37 is biased in a direction of holding the engagement with the loop 38, which engagement with the loop 38 is released by operating the lever 42.

[Installation Structure of Bonnet]

The installation structure of the bonnet 30 will now be described.

Figure 9:
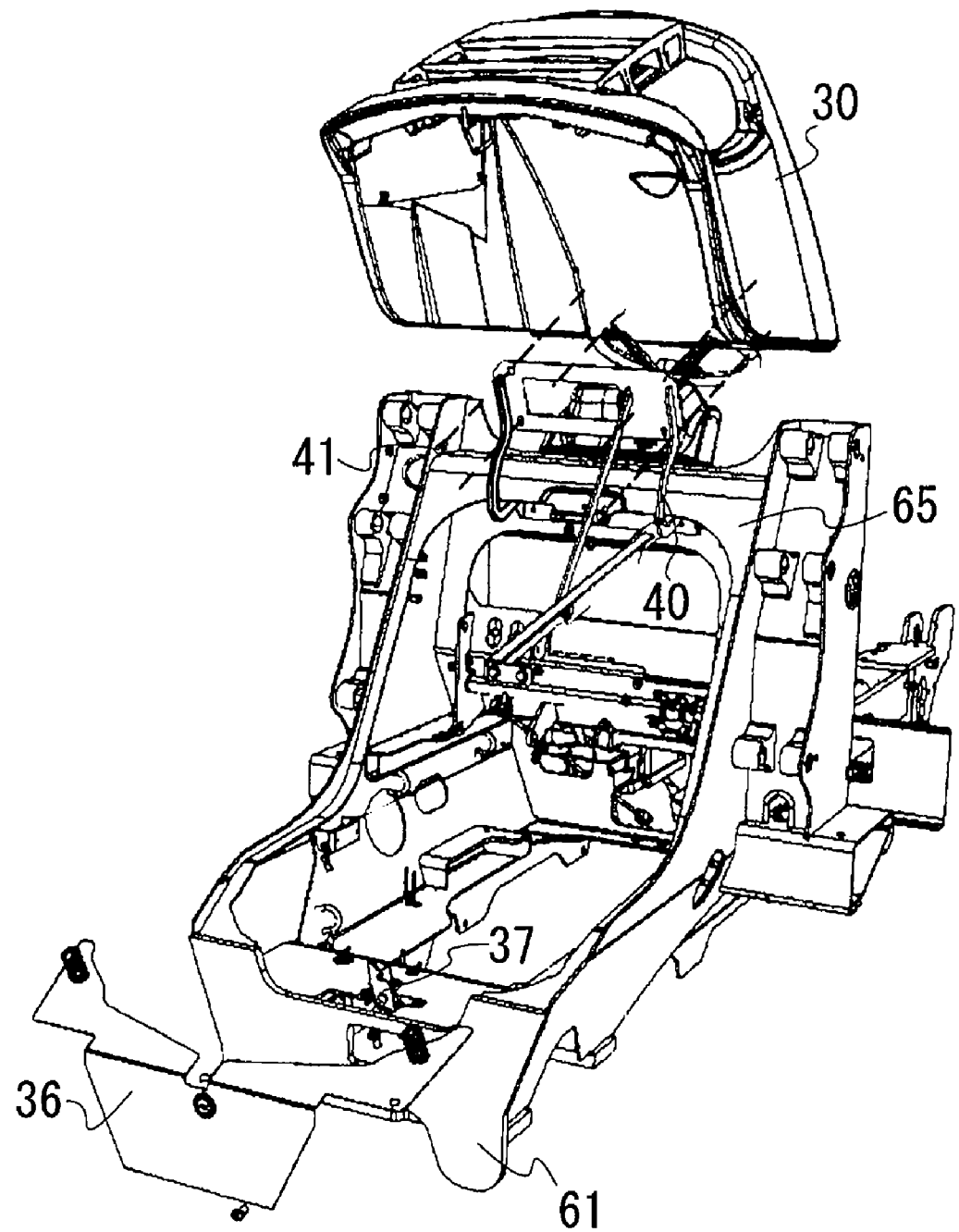
FIG. 9 is a perspective view showing an assembly structure of the bonnet.

FIG. 9 is a perspective view showing an assembly structure of the bonnet.

Figure 10:
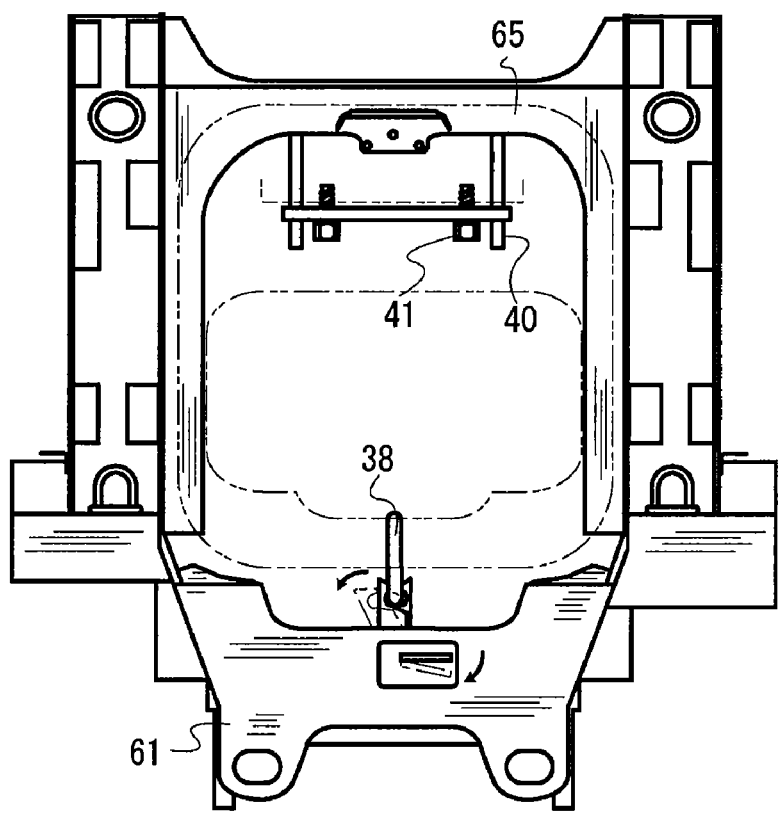
FIGS. 10(a) and 10(b) are frame format views showing an installation state of the bonnet.
Figure 10:
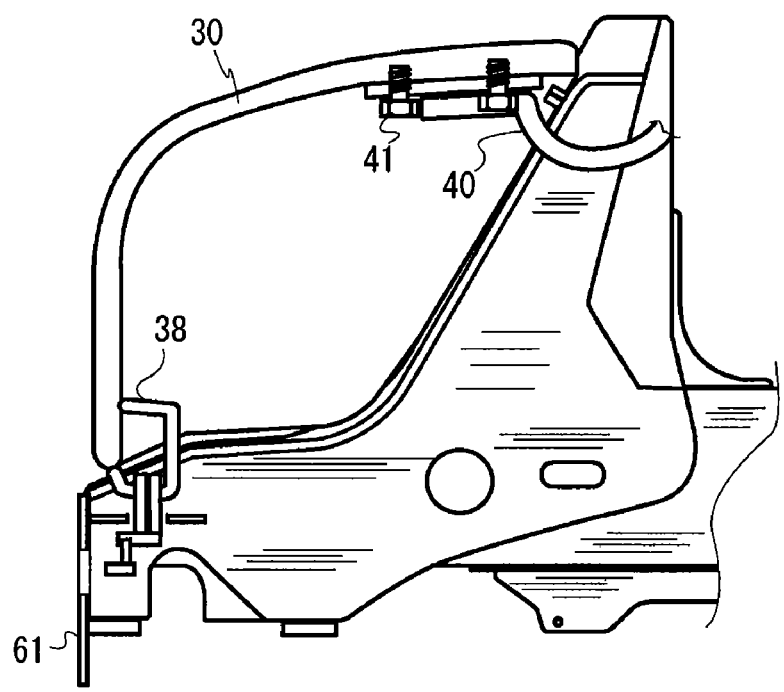

FIG. 10 is a frame format view showing an installation state of the bonnet. FIG. 10(a) is a front frame format view showing an installation state of the bonnet, and FIG. 10(b) is a side frame format view showing an installation state of the bonnet.

Figure 11:
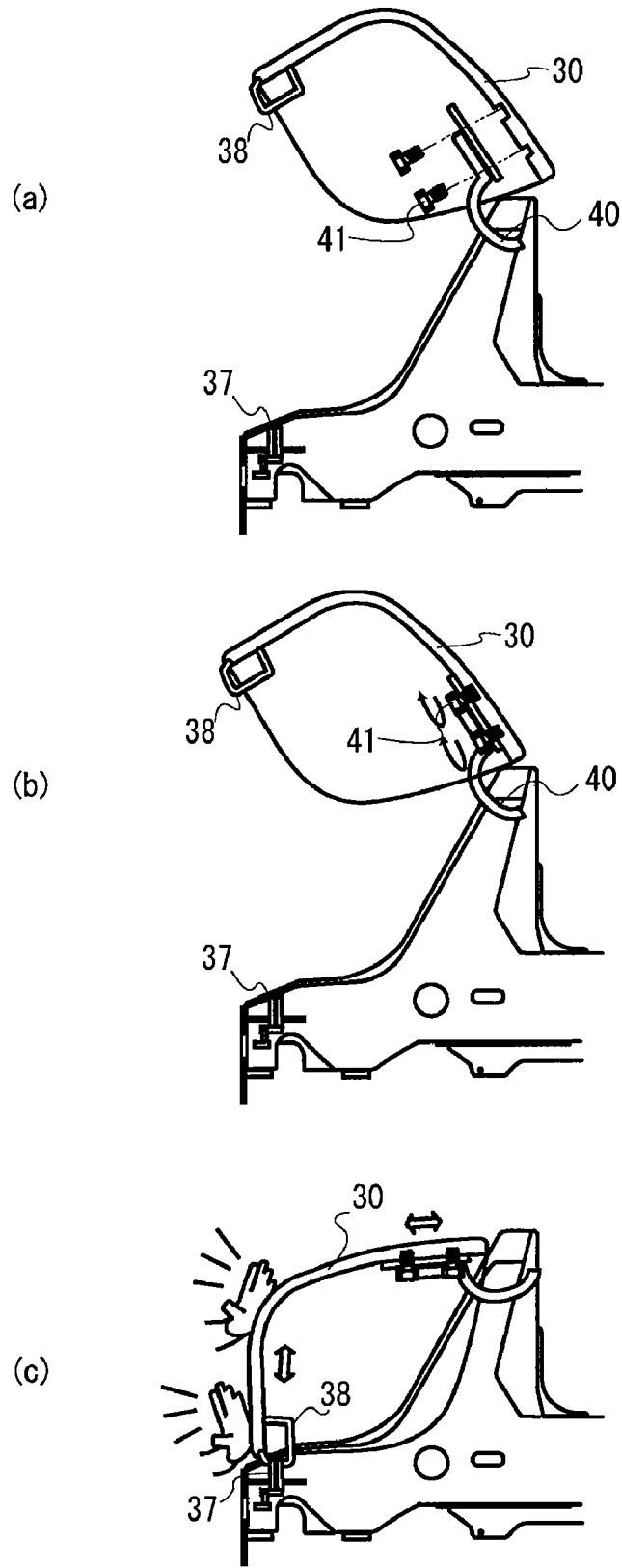
FIG. 11(a) through 11(c) are frame format views of the first half of the installation process of the bonnet.

FIG. 11 is a frame format view of the first half of the installation process of the bonnet.

Figure 12:
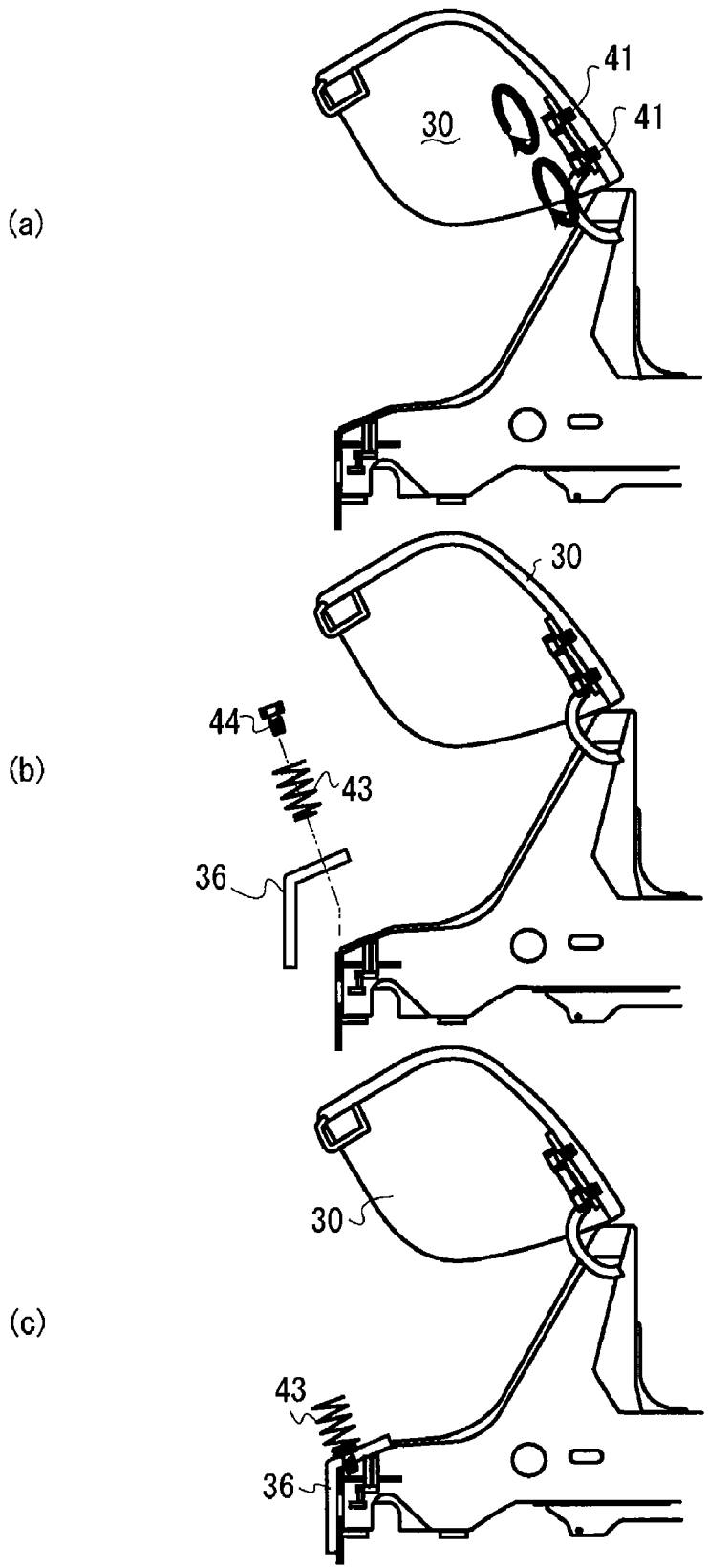
FIG. 12(a) through 12(c) are frame format views showing the last half of the installation process of the bonnet.

FIG. 12 is a frame format view showing the last half of the installation process of the bonnet.

Figure 13:
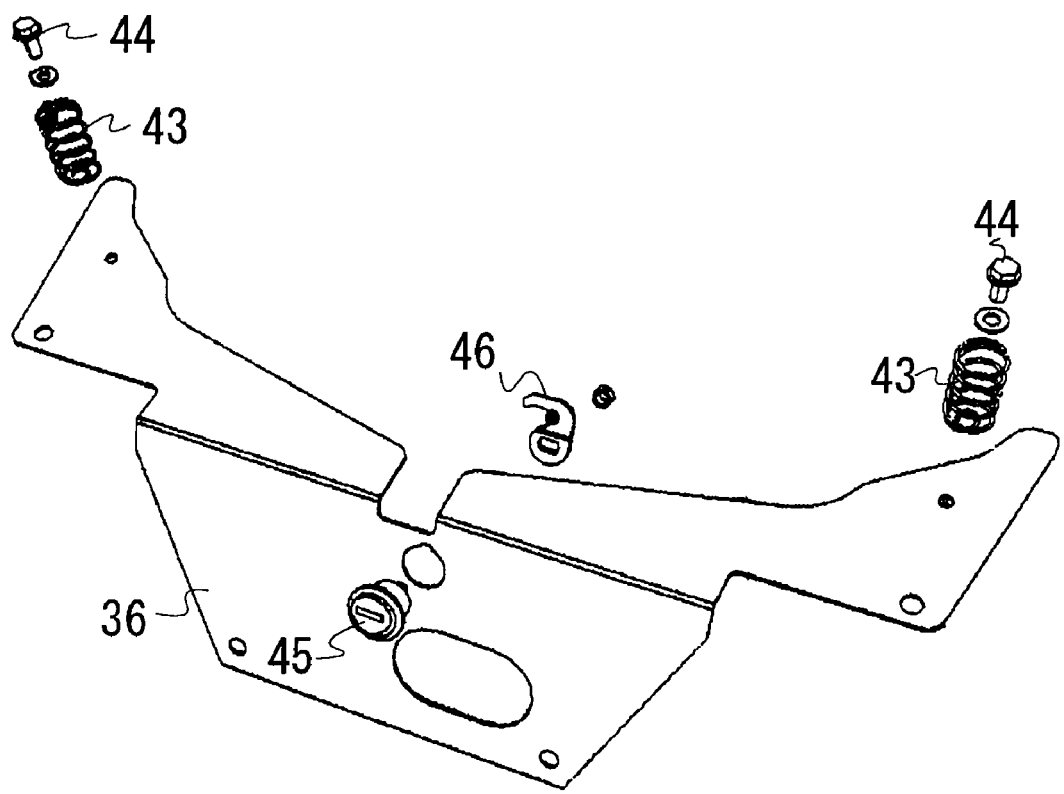
FIG. 13 is a view showing an assembly structure of the cover.

FIG. 13 is a view showing an assembly structure of the cover.

The bonnet 30 is supported by the frame 9 by way of an arm 40. The arm 40 is turnable with respect to the frame 9, and the arm 40 is connected to the back section of the bonnet 30. The bonnet 30 and the arm 40 are connected by bolts, 41, so that the bonnet 30 integrally turns with the arm 40.

In a state the bonnet 30 is closed, the bonnet 30 has the front section held by the holding mechanism 31 and the back section supported by the arm 40. The position of the bonnet 30 with respect to the frame 9 is thereby determined, and the bonnet 30 can be reliably closed with respect to the frame 9.

The bonnet 30 is attached to the frame 9 as shown in (a), (b), (c) of FIG. 11 and (a), (b), (c) of FIG. 12. First, as shown in FIG. 11(a) and (b), bolts 41 are screwed into the bonnet 30 by way of the arm 40. When a force greater than or equal to a constant is applied to the bonnet 30 at this point, installation is carried out to an extent the position with respect to the arm 40 is slightly shifted. In this state, the bonnet 30 is closed, and the positioning of the bonnet 30 is performed, as shown in FIG. 11(c). The positioning is performed such that the holding mechanism 31 operates with the bonnet 30 closed. That is, position adjustment of the bonnet 30 is performed such that the loop 38 engages the hook 37.

As described above, since the cutout section 61b is formed in the front plate 61, the engagement state of the loop 38 and the hook 37 can be easily recognized, and a work space for adjusting the position of the bonnet 30 can be ensured. For instance, the front edge of the bonnet 30 can be held, the loop 38 can be engaged to the hook 37, and the distortion of the bonnet 30 can be corrected. The bonnet 30 is thus positioned at the position of being reliably closed.

Subsequently, the bonnet 30 is again opened and the bolt 41 is reliably tightened at a predetermined torque. The bonnet 30 thus can be attached to the normal position, and the work therefor is easily performed.

Since the positioning work can be performed at a position distant from the connecting section of the arm 40 and the bonnet 30 while holding the vicinity of the arrangement section of the loop 38 for positioning, position adjustment of the bonnet 30 can be performed with a small force by temporarily attaching the bonnet 30, whereby the work space for directly position adjusting the bonnet 30 with respect to the hook 37 is obtained.

The cover 36 is attached to the front section of the frame 9. The cover 36 covers the cutout section 61b of the front plate 61, seals the opening in the cutout section 61b, and enables the air introduced into the bonnet 30 to pass through the radiator. A spring 43 is attached on both left and right sides of the upper surface of the cover 36. The spring 43 biases the bonnet 30 upward and cushions the impact at closing the bonnet 30 so that bits do not occur after being closed, where the spring 43 is attached to the frame 9 with the cover 36 by the bolt 44.

Therefore, the number of components can be reduced. The cover 36 can be positioned with respect to the positioned bonnet 30 thereby enhancing the assembly accuracy.

A key lock is attached to the cover 36 in addition to the spring 43. The key lock is configured by a key cylinder 45 and a lock hook 46. The key cylinder 45 has the lock hook 46 attached to the back section with the key inserting port exposed to the surface of the cover 36, and attached to the cover 36. The lock hook 46 engages the loop 38 in a closed state, and the bonnet 30 can be opened with the lever 42 by inserting the key into the key cylinder 45 and turning the lock hook 46 to unlock.

The cover 36 is configured as a separate body from the frame 9, and is configured by a member smaller than the frame 9. Thus, the surface of the cover 36 is finished to high smoothness at low cost. By having the cover 36 as an installation section of the face plate, the face plate can be easily attached and the durability of the attached face plate can also be enhanced.

[Bonnet Seal]

The seal 32, 33 of the bonnet 30 in the stay installation section 65b will now be described.

FIG. 14 is a partial cross sectional perspective view showing a seal structure of the stay installation section.

Figure 15:
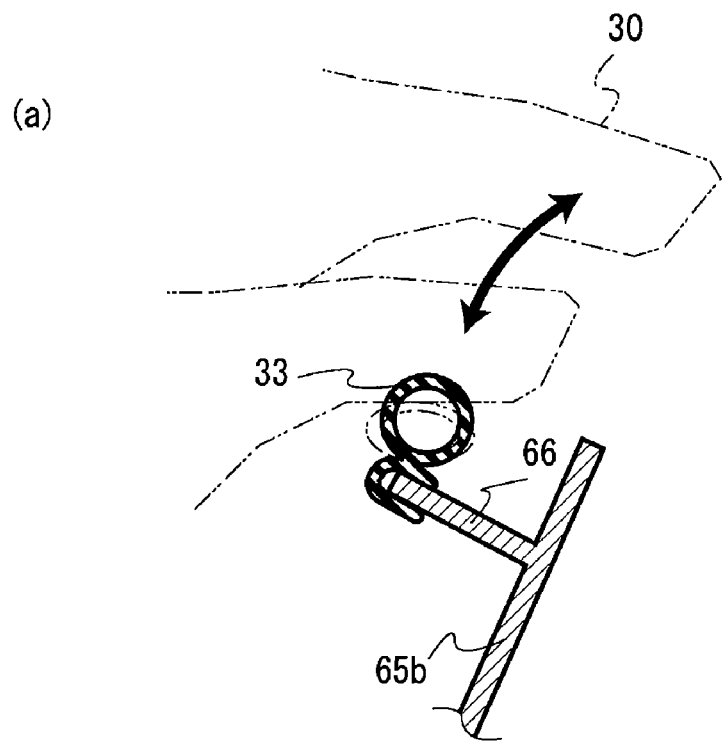
FIGS. 15(a) and 15(b) are a frame format view showing a contacting structure of the seal and the bonnet.
Figure 15:
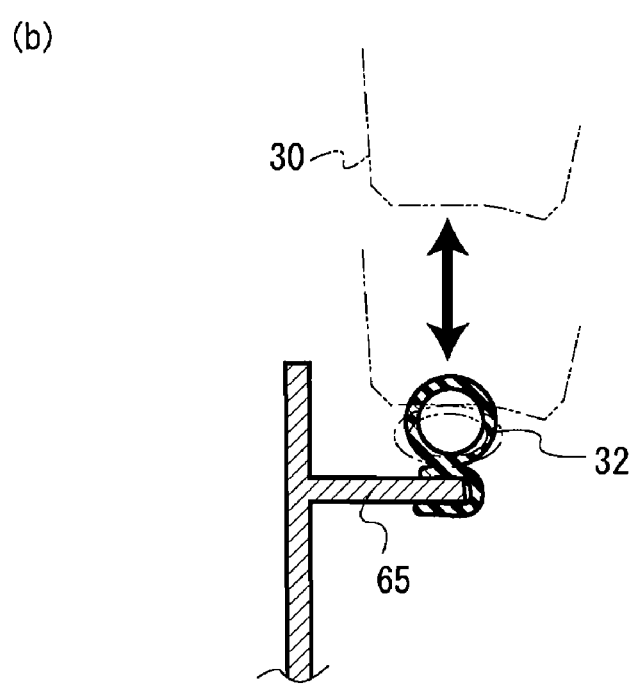

FIG. 15 is a frame format view showing the contacting structure of the seal and the bonnet. FIG. 15(a) is a frame format showing a seal contacting structure at a projection, and FIG. 15(b) is a frame format view showing a seal contacting structure at the rib.

The seal 32, 33 has a shape with a tube attached to a side surface of a long object having a cross section of a U-shape. At the projection 66 arranged in the stay installation section 65b, the seal 33 is arranged so that the tube shaped portion covers the outer side of the edge of the projection 66 by attaching the U-shaped portion at the edge of the projection 66. The seal 32 is arranged so that the tube shaped portion is positioned on the upper surface side of the rib 65 with the U-shaped portion attached to the edge of the opening side of the rib 65.

Therefore, by attaching the seal 32, 33, the tube portion of the seal 33 contacts the back surface of the upper back section of the bonnet 30, and the seal 32 contacts the lower surface of the edge of the bonnet 30, as shown in FIG. 15(a).

The seal 32 is also attached to the bonnet side portion of the cover 36 attached to the frame 9. Thus, the space between the bonnet 30 and the frame 9 is closed by the seal 32, 33 thus preventing flow-out of air, and preventing cooling wind from flowing out towards the control section and enhancing silence during the drive.

INDUSTRIAL APPLICABILITY

The present invention is applicable to a bonnet structure of a working vehicle.

The invention claimed is:

1. A working vehicle comprising:
a vehicle frame having a front section;
a bonnet arranged on the front section of the vehicle frame;
a first engagement mechanism for the bonnet provided at the front section of the vehicle frame;
a second engagement mechanism at a front lower end section of the bonnet;
a front face of the vehicle frame comprising a plate having a cutout section; and
a cover, doubling as a seal member for the bonnet, provided at the cutout section;
wherein in a state in which the first engagement mechanism and the second engagement mechanism are engaged, the first engagement mechanism and the second engagement mechanism are positioned on one side of the cutout section and a portion of the cover that covers the cutout section is positioned on an opposite side of the cutout section.

2. A working vehicle comprising:
a vehicle frame having a front section;
a bonnet arranged on the front section of the vehicle frame;
a first engagement mechanism for the bonnet provided at the front section of the vehicle frame;
a second engagement mechanism at a front lower end section of the bonnet;
a front face of the vehicle frame comprising a plate having a cutout section through which the engagement mechanism of the bonnet is viewable;
a cover, doubling as a seal member for the bonnet, provided at the cutout section, wherein the cover is extended to the front face of the frame; and
a key lock is provided on the cover.

3. The working vehicle according to claim 1, wherein:
an installation section for a stay for supporting a back section of the bonnet is arranged on the vehicle frame;
a projection for covering the installation section for the stay is provided on the vehicle frame; and
a seal for the bonnet is provided at the projection.

4. The working vehicle according to claim 1, wherein the first engagement mechanism comprises a hook.

5. The working vehicle according to claim 1, wherein the second engagement mechanism comprises a loop.

6. The working vehicle according to claim 2, wherein the first engagement mechanism comprises a hook.

7. The working vehicle according to claim 2, wherein the second engagement mechanism comprises a loop.

8. The working vehicle according to claim 2, wherein:
an installation section for a stay for supporting a back section of the bonnet is arranged on the vehicle frame;
a projection for covering the installation section for the stay is provided on the vehicle frame; and
a seal for the bonnet is provided at the projection.

* * * * *